US012715696B2

(12) United States Patent
Malhotra et al.

(10) Patent No.: US 12,715,696 B2
(45) Date of Patent: Aug. 25, 2026

(54) HYBRID STORAGE FACILITY

(71) Applicant: Grey Orange Inc., Roswell, GA (US)

(72) Inventors: Siddharth Malhotra, New Delhi (IN); Mohit Kumar, Meerut (IN); Sumit Kr. Tiwary, Gorakhpur (IN)

(73) Assignee: Grey Orange Inc., Roswell, GA (US)

(*) Notice: Subject to any disclaimer, the term of this patent is extended or adjusted under 35 U.S.C. 154(b) by 876 days.

(21) Appl. No.: 17/710,219

(22) Filed: Mar. 31, 2022

(65) Prior Publication Data

US 2022/0315338 A1 Oct. 6, 2022

(30) Foreign Application Priority Data

Mar. 31, 2021 (IN) ............................ 202111015301

(51) Int. Cl.
*B65G 1/137* (2006.01)
*B65G 1/04* (2006.01)
(Continued)

(52) U.S. Cl.
CPC ......... *B65G 1/1378* (2013.01); *B65G 1/0492* (2013.01); *B65G 1/065* (2013.01);
(Continued)

(58) Field of Classification Search
CPC .... B65G 1/1378; B65G 1/0492; B65G 1/065; B65G 1/1373; B65G 1/0485; B66F 9/19;
(Continued)

(56) References Cited

U.S. PATENT DOCUMENTS

2001/0017023 A1* 8/2001 Armington ............. B65B 61/22 53/503
2009/0204513 A1* 8/2009 Tirinato ................. G01K 13/00 705/28

(Continued)

FOREIGN PATENT DOCUMENTS

JP 2020132401 A * 8/2020 ........... B65G 1/1378
SU 543579 A * 3/1977 ............. B65G 25/04

OTHER PUBLICATIONS

JP-2020132401-A (Year: 2020).*
SU-543579-A (Year: 1977).*

*Primary Examiner* — Ernesto A Suarez
*Assistant Examiner* — Laurence R Brothers
(74) *Attorney, Agent, or Firm* — Oblon, McClelland, Maier & Neustadt, L.L.P.

(57) ABSTRACT

A system for managing inventory items within a storage facility includes a control server communicably coupled to a first robotic apparatus and a second robotic apparatus. The storage facility includes a dynamic storage space in which a dynamic storage system is placed beneath the static storage system. The control server maps inventory items to one of the dynamic storage system and the static storage system based on a set of attributes. The control server receives request for fulfillment of an order. Based on the received request, the first robotic apparatus retrieves inventory items stored in the dynamic storage system, and the second robotic apparatus retrieves inventory items stored in the static storage system. The inventory items collected from the dynamic storage system and the static storage system are transported to an order fulfillment and replenishment location to consolidate the retrieved items and fulfill the order.

13 Claims, 6 Drawing Sheets

(51) Int. Cl.

| | |
|---|---|
| ***B65G 1/06*** | (2006.01) |
| ***B66F 9/075*** | (2006.01) |
| ***B66F 9/19*** | (2006.01) |
| ***G06F 21/31*** | (2013.01) |
| ***G06Q 10/0836*** | (2023.01) |
| ***G06Q 10/0875*** | (2023.01) |
| *G06F 21/88* | (2013.01) |

(52) U.S. Cl.
CPC .............. *B65G 1/1373* (2013.01); *B66F 9/19* (2013.01); *G06F 21/31* (2013.01); *G06Q 10/0836* (2013.01); *G06Q 10/0875* (2013.01); *B66F 9/0755* (2013.01)

(58) Field of Classification Search
CPC ........ B66F 9/0755; G06F 21/31; G06F 21/88; G06Q 10/0836; G06Q 10/0875
See application file for complete search history.

(56) References Cited

U.S. PATENT DOCUMENTS

| | | | | |
|---|---|---|---|---|
| 2014/0100715 | A1* | 4/2014 | Mountz | B65G 1/1378 701/2 |
| 2014/0330426 | A1* | 11/2014 | Brunner | B65G 1/1378 700/216 |
| 2017/0203920 | A1* | 7/2017 | Otto | B66F 9/24 |
| 2017/0357940 | A1* | 12/2017 | Radhakrishnan | G06Q 10/0875 |
| 2020/0027154 | A1* | 1/2020 | Godsey | G06Q 30/0635 |
| 2020/0104898 | A1* | 4/2020 | Cui | G06Q 30/0633 |
| 2020/0273132 | A1* | 8/2020 | Yoshitake | B65G 1/1378 |

* cited by examiner

HYBRID STORAGE FACILITY

CROSS-REFERENCE TO RELATED APPLICATIONS/INCORPORATION BY REFERENCE

This Patent Application makes reference to, claims priority to, and claims the benefit of US provisional application IN202111015301 filed Mar. 31, 2021, the contents of which are hereby incorporated herein by reference in its entirety.

FIELD

Various embodiments of the disclosure relate generally to inventory management systems. More specifically, various embodiments of the disclosure relate to methods and systems for storing and managing inventory in a hybrid storage facility.

BACKGROUND

A storage facility typically handles a large number of inventory items that are stored in different types of storage like pallets, totes, mobile storage systems, static racks storing totes, etc. The storage facility includes various sections of storage areas where such mobile storage systems and totes are stored. The mobile storage systems are typically placed at a ground level and have an elevated base to allow a robotic apparatus to easily access (e.g., pick-up and place) the storage system for transportation, whereas the totes are stored in fixed racks at different storage areas. Mobile storage systems and the racks being placed in different sections of storage areas result in a significant increase in the horizontal footprint of the storage facility. Further, retrieval of a mixed range of items (e.g., large items, small items, temperature-controlled items) from various sections of storage areas consumes additional time, effort, and resources as a large number of mobile storage systems and totes may be required to be accessed. Hence, consolidation of an order takes longer and requires additional resources for its fulfillment. Thus, there exists a need for a technical and reliable solution that overcomes the abovementioned problems.

Limitations and disadvantages of conventional and traditional approaches will become apparent to one of skill in the art, through comparison of described systems with some aspects of the present disclosure, as set forth in the remainder of the present application and with reference to the drawings.

SUMMARY

In an embodiment of the present disclosure, a system in a storage facility is disclosed. The system comprises a first static storage system, a first dynamic storage system, a first robotic apparatus, a second robotic apparatus, a third robotic apparatus and a control server. The first static storage system is affixed to ground and comprises a plurality of shelves arranged at different heights from the ground. The plurality of shelves stores a first set of totes. The first dynamic storage system is transportable and placed beneath a first shelf that is lowermost amongst the plurality of shelves. The first robotic apparatus is configured to transport the first set of totes from the first static storage system to an order fulfilment and replenishment location in the storage facility. The second robotic apparatus is configured to transport the first dynamic storage system from beneath the first shelf to the order fulfilment and replenishment location. The third robotic apparatus can be used along with the first robotic apparatus to transport the totes from the dynamic storage system to the order fulfilment and replenishment location in the storage facility. The control server is configured to map a first inventory item to one of the first static storage system and the first dynamic storage system for storage based on (i) a first transportation time of the first robotic apparatus to transport a tote of the first set of totes between the first static storage system and the order fulfilment and replenishment location, (ii) a second transportation time of the second robotic apparatus to transport the first dynamic storage system to the order fulfilment and replenishment location, and (iii) a set of attributes of the inventory item. The control server is further configured to control one of (i) the first robotic apparatus to enable storage of the first inventory item in one of the first set of totes based on the mapping of the first inventory item to the first static storage system or (ii) the second robotic apparatus to enable storage of the first inventory item in the first dynamic storage system based on the mapping of the first inventory item to the first dynamic storage system.

In some embodiments, the set of attributes comprises a size of the first inventory item, a weight of the first inventory item, a shape of the first inventory item, a number of units of the first inventory item, a consumption rate of the first inventory item, and a compatibility of the first inventory item with one or more inventory items previously stored in the first static storage system and the first dynamic storage system.

In some embodiments, the control server is further configured to control a movement of the first robotic apparatus and the second robotic apparatus to transport the first set of totes and the first dynamic storage system to the order fulfilment and replenishment location, respectively.

In some embodiments, the control server is further configured to change the mapping of the first inventory item based on a change in at least one attribute of the set of attributes of the first inventory item.

In some embodiments, the control server changes the mapping of the first inventory item from the first static storage system to the first dynamic storage system based on a consumption rate of the first inventory item exceeding a threshold consumption rate.

In some embodiments, the control server changes the mapping of the first inventory item from the first dynamic storage system to the first static storage system based on a consumption rate of the first inventory item falling below a threshold consumption rate.

In some embodiments, the system further comprises a second dynamic storage system that is transportable and placed besides the first dynamic storage system, and beneath the first shelf of the first static storage system.

In some embodiments, a space between two shelves of the plurality of shelves is adjustable based on a size and one or more dimensions of the first set of totes.

In some embodiments, the first set of totes comprises a first tote and a second tote such that the second tote is placed besides the first tote on a same shelf of the plurality of shelves. The first tote is configured to store the first inventory item of a first type, and the second tote is configured to store the first inventory item of a second type.

In some embodiments, the first static storage system has an N-deep storage capability such that a first tote of the set of totes is placed behind a second tote of the set of totes on a same shelf of the plurality of shelves.

In some embodiments, the set of totes comprises a first tote and a second tote placed behind the first tote on the same shelf of the plurality of shelves such that the first tote stores a second inventory item and the second tote stores a third inventory item. The control server is further configured to instruct the first robotic apparatus to change a placement order of the first tote and the second tote such that the second tote is placed in front of the first tote based on a consumption rate of the third inventory item exceeding a consumption rate of the second inventory item.

Methods and systems for managing inventory in a storage facility are provided substantially as shown in, and described in connection with, at least one of the figures, as set forth. The system may include a control server, one or more first robotic apparatus communicably coupled to the control server, one or more second robotic apparatus communicably coupled to the control server, one or more dynamic storage systems and one or more static storage systems. One or more dynamic storage systems is placed beneath a static storage system. The control server may be configured to receive a service request for fulfillment of an order. The control server may be further configured to communicate one or more transit instructions to a first robotic apparatus and/or a second robotic apparatus for fulfillment of the order. The first robotic apparatus and/or the second robotic apparatus may retrieve one or more inventory items or totes storing the one or more inventory items required for fulfillment of the order from corresponding storage systems. In an embodiment, the first robotic apparatus may retrieve the one or more dynamic storage systems for storing the one or more inventory items. In another embodiment, the second robotic apparatus may retrieve one or more totes storing the one or more inventory items from the one or more static storage systems. The one or more inventory items collected from at least one of the one or more dynamic storage systems and the one or more static storage systems may be transported to an order fulfillment and replenishment location. At the order fulfillment and replenishment location, the one or more inventory items may be scanned and verified to match with the received order. Subsequently, the one or more inventory items are consolidated to form a deliverable package for order fulfilment.

The control server maps the inventory item to one of the static storage system or dynamic storage system based on a set of attributes and a transportation time of the first robotic apparatus and the second robotic apparatus to transport a tote and a dynamic storage system to the order fulfilment and replenishment location, respectively. The control server further enables storage of the inventory item in one of the static storage system and the dynamic storage system based on the mapping of the inventory item to one of the static storage system and the dynamic storage system, respectively.

These and other features and advantages of the present disclosure may be appreciated from a review of the following detailed description of the present disclosure, along with the accompanying figures in which like reference numerals refer to like parts throughout.

DETAILED DESCRIPTION

Certain embodiments of the disclosure may be found in disclosed systems and methods for inventory management in a storage facility. Exemplary aspects of the disclosure provide methods for managing inventory in a storage facility. The methods include various operations that are executed by a server (for example, a control server) for managing inventory in a storage facility.

The methods and systems of the disclosure provide a one-stop solution for managing inventory in a storage facility. The method and system disclosed herein allow for inventory items having different consumption rates and storage requirements to be stored at a single storage facility, i.e., a hybrid storage facility.

Figure 1:
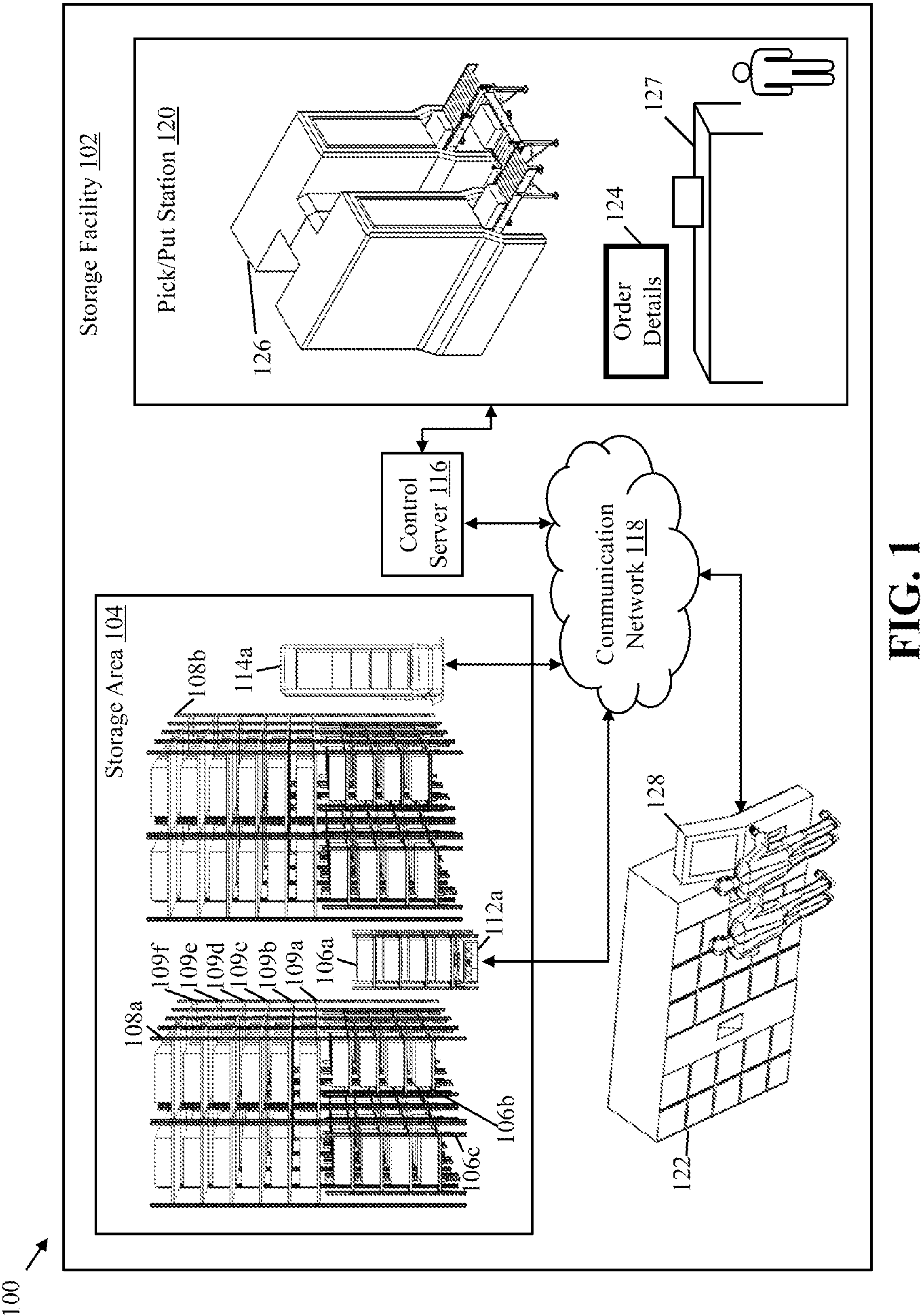
FIG. 1 is a schematic diagram that illustrates a system environment of a storage facility, in accordance with an exemplary embodiment of the disclosure.

FIG. 1 is a schematic diagram that illustrates a system environment 100 for inventory management in a storage facility 102, in accordance with an exemplary embodiment of the disclosure. The system environment 100 includes a storage facility 102. The storage facility 102 includes a storage area 104, a plurality of dynamic storage systems 106*a*-106*c* (hereinafter, collectively referred to as "the dynamic storage systems 106"), a plurality of static storage systems 108*a*-108*b* (hereinafter, collectively referred to as "the static storage systems 108"), a plurality of first robotic apparatus of which a first robotic apparatus 112*a* is shown, a plurality of second robotic apparatus of which a second robotic apparatus 114*a* is shown, a control server 116, a communication network 118, a pick/put station (PPS) 120, and a delivery station 122. The PPS 120 may include a display 124 and a HAIPORT 126. The control server 116 may communicate with the first robotic apparatus 112*a* and the second robotic apparatus 114*a* by way of the communication network 118 or via separate communication networks established therebetween. The PPS 120 and the delivery station 122 may be communicatively coupled to the control server 116 to receive instructions for order consolidation, order delivery, and/or inventory item mapping and rotation. One or more concepts regarding the inventory item mapping and rotation are described in detail in conjunction with FIG. 4. The communication network 118 is a medium through which instructions and messages are transmitted between the control server 116 and at least one of the first robotic apparatus 112*a*, the second robotic apparatus 114*a*, the PPS 120, and the delivery station 122. Examples of the communication network 118 may include, but are not limited to, a wireless fidelity (Wi-Fi) network, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, and a combination thereof. Various entities (such as the first robotic apparatus 112*a*, the second robotic apparatus 114*a*, and the control server 116) in the system environment 100 may be coupled to the communication network 118 in accordance with various wired and wireless communication protocols, such as Transmission Control Protocol and Internet Protocol (TCP/IP), User Datagram Protocol (UDP), Long Term Evolution (LTE) communication protocols, or any combination thereof.

The storage facility 102 may be a warehouse facility where inventory items or packages of inventory items are stored for order fulfillment and/or selling. Examples of the storage facility 102 may include, but are not limited to, a forward warehouse, a backward warehouse, a fulfilment center, or a retail store (e.g., a supermarket, an apparel store, a departmental store, a grocery store, or the like). Examples of the inventory items may include, but are not limited to, groceries, apparels, electronic goods, mechanical goods, or the like. The range of inventory items may further vary in size, shape, weight, control conditions, dimensions, or the like. In an example, the inventory items may be nuts and bolts, refrigerators, fast moving consumer goods, or the like. The storage facility 102 may have the storage area 104 where the dynamic storage systems 106 and the static storage systems 108 are placed for storing the inventory items. The storage area 104 may be of any shape, for example, a rectangular shape, a circular shape, or the like. The storage facility 102 having mixed type of storage systems to store inventory items as per specific storage requirement and dynamic consumption rate is referred to as a "hybrid storage facility".

The dynamic storage systems 106 are movable storage devices that store various inventory items and/or various packages of different dimensions, types, shapes, materials, and capacity. Each of the dynamic storage systems 106 may include a plurality of first shelves, which enable the dynamic storage systems 106 to store multiple inventory items and/or packages. Each of the dynamic storage systems 106 may further include a reference marker associated therewith for uniquely identifying the corresponding dynamic storage system. Examples of the reference marker may include, but are not limited to, a barcode, a quick response (QR) code, a radio frequency identification device (RFID) tag, or the like. It will be apparent to those of skill in the art that the dynamic storage systems 106 may further include additional structural features that aid in transporting the dynamic storage systems 106, without deviating from the scope of the disclosure. The dynamic storage systems 106 are transported (or moved) from one location to another location by the first robotic apparatus 112*a* (e.g., robotic rangers, automated guided vehicles (AGVs), or the like) used in the storage facility 102. The dynamic storage systems 106 may include a first dynamic storage system 106*a*, a second dynamic storage system 106*b*, a third dynamic storage system 106*c*, and a fourth dynamic storage system (not shown). In an embodiment, the fourth dynamic storage system is transportable and placed besides the second dynamic storage system 106*b*.

In one embodiment, the dynamic storage systems 106 are transported by the first robotic apparatus 112*a* to an order fulfilment and replenishment location in the storage facility 102. The order fulfilment and replenishment location is a location or an area in the storage facility 102 where operations pertaining to order consolidation and fulfilment, and inventory replenishment may be performed by an operator or a robotic machine. The PPS 120 is stationed at the order fulfilment and replenishment location.

The static storage systems 108 are fixed storage devices (affixed to ground) that have a plurality of second shelves 109*a*-109*f*. The plurality of second shelves 109*a*-109*f* have a first set of totes placed thereon to store the inventory items and/or packages. A count of second shelves in each of the static storage systems 108 may vary as per requirement. The static storage systems 108 may have an architecture that maximizes utilization of vertical and horizontal space within the storage facility 102. The plurality of second shelves 109*a*-109*f* are arranged at different heights from the ground. A space between two shelves of the plurality of second shelves 109*a*-109*f* is adjustable based on a size and one or more dimensions of the first set of totes. The static storage systems 108 include a first static storage system 108*a* and a second static storage system 108*b*. In an embodiment, the second dynamic storage system 106*b* and the fourth dynamic storage system are placed beneath a first shelf (i.e., a lowermost shelf) 109*a* of the first static storage system 108*a*. In other words, the first shelf 109*a* of the first static storage system 108*a* is positioned at such a height from the ground which enables the second dynamic storage system 106*b* and the fourth dynamic storage system to be stored beneath the first shelf. For example, the dynamic storage systems 106 may have a height that is smaller than a distance between the lowermost shelf of the static storage systems 108 and the working floor of the storage area 104. In other words, the dynamic storage systems 106 may have a resting area beneath the static storage systems 108.

The static storage systems 108 are organized in a plurality of rows and columns. The static storage systems 108 when organized in the plurality of rows and columns form aisles therebetween. The second robotic apparatus 114*a* may move through the aisles in order to access the static storage systems 108. The second robotic apparatus 114*a* may access the static storage systems 108 to retrieve the first set of totes from the plurality of second shelves 109*a*-109*f*, rearrange the first set of totes placed on the plurality of second shelves 109*a*-109*f*, or place new totes on the plurality of second shelves 109*a*-109*f*. In an embodiment, the storage in the static storage systems 108 may be in the form of N-deep storage where totes on each shelf of the plurality of second shelves 109*a*-109*f* are placed in rows and columns. In other words, each of the static storage systems 108 may have an N-deep storage capability such that a first tote of the first set of totes is placed behind a second tote of the first set of totes on the same shelf of the plurality of second shelves 109*a*-109*f*.

The second robotic apparatus 114*a* may be a mobile robot (for example, vertical autonomous mobile robots (VAMR)) configured to travel within the storage facility 102 in order to retrieve the first set of totes from the static storage systems 108 and place the first set of totes in the static storage systems 108 for order fulfilment and inventory replenishment. The second robotic apparatus 114*a* may have an adjustable height, robotic arms, and additional components (such as a hook, a magnetic shelf, or the like) for handling the first set of totes. Each of the static storage systems 108 may be associated with a reference marker using which the second robotic apparatus 114*a* may be configured to identify a desired static storage system or a shelf of the desired static storage system. Beneficially, the different types of storage systems (such as the dynamic storage systems 106 and the static storage systems 108) allow for reduction of horizontal footprint of the storage facility 102 along with improving the throughput of the storage facility 102.

In an embodiment, the dynamic storage systems 106 may be configured to store the inventory items that have to be moved frequently. In other words, the dynamic storage systems 106 may store the inventory items that have to be stored for a small period of time (for example, 24 hours, 48 hours, or the like). The static storage systems 108 may be configured to store the inventory items that are moved less frequently as compared to the inventory items stored in the dynamic storage systems 106. The static storage systems 108 may further store the inventory items that are required to replenish the stock in the dynamic storage systems 106.

In an embodiment, the inventory items may be stored in at least one of the dynamic storage systems 106 and the static storage systems 108 based on a consumption rate associated therewith. The term "consumption rate" may refer to a pace of utilization of an inventory item. The consumption rate may be indicative of a probable time duration within which the corresponding inventory item goes out of the storage facility 102. The consumption rate may also be indicative of a time period for which the inventory items are to be stored within the storage facility 102. The consumption rate may be defined based on a count of items of a specific type going out of the storage facility 102 per unit time (e.g., per hour, per day, or the like).

In an example, the dynamic storage systems 106 may be configured to store the inventory items and/or packages with high consumption rates (i.e., fast-moving inventory items). Therefore, the dynamic storage systems 106 may be frequently accessed for retrieval of the inventory items and/or packages stored therein. The first set of totes placed in the static storage systems 108 may be configured to store inventory items and/or packages with consumption rate lower than the consumption rate of the inventory items stored in the dynamic storage systems 106. In other words, the static storage systems 108 may be configured to store slow-moving inventory items. The static storage systems 108 may be accessed less frequently relative to the dynamic storage systems 106.

In an example, inventory items having consumption rates within a range of $C_1$-$C_2$ may be stored in the dynamic storage systems 106, and inventory items having consumption rates within a range of $C_2$-$C_3$ may be stored in the static storage systems 108. The range $C_1$-$C_2$ may be greater than the range $C_2$-$C_3$. For example, a value of $C_1$ may be "100 and above", a value of $C_2$ may be "70", and a value of $C_3$ may be "1" and below". Therefore, inventory items having consumption rates between "100 and above" and "70" may be stored in the dynamic storage systems 106. Inventory items having consumption rates between "70" and "1" may be stored in the static storage systems 108. The control server 116 may be configured to determine the consumption rates of various inventory items and map storage systems based on the determined consumption rates. In one example, the control server 116 may implement one or more predictive analysis or forecasting techniques to forecast (or predict) the consumption rates of inventory items based on a past trend of consumption rates of the inventory items. In an embodiment, the consumption rates associated with the inventory items may be dynamic. Therefore, the inventory items may be rotated across the dynamic storage systems 106 and the static storage systems 108 based on their current consumption rates.

In an embodiment, an operational time required for accessing the static storage systems 108 may be higher as compared to an operational time required for accessing the dynamic storage systems 106. For example, an operational time required to transport an inventory item stored in one of the static storage systems 108 to the PPS 120 may be higher as compared to an operational time required for transporting an inventory item stored in one of the dynamic storage systems 106 (stationed at the same location as the static storage system) to the PPS 120. In an embodiment, the inventory items may be rotated (or relocated) dynamically among the dynamic storage systems 106 and the static storage systems 108 based on dynamically changing consumption rates of the inventory items and desired throughput requirements at the storage facility 102 as described in later in the description of FIG. 4.

In an embodiment, the dynamic storage systems 106 may be associated with a first size criteria (e.g., a permissible size range or a permissible dimension range) and the static storage systems 108 may be associated with a second size criteria. In such a scenario, the dynamic storage systems 106 may be used to store only those inventory items that satisfy the first size criteria and the static storage systems 108 may be used to store the inventory items that satisfy the second size criteria.

In an embodiment, the dynamic storage systems 106 may be associated with a first weight criteria (e.g., a permissible weight range) and the static storage systems 108 may be associated with a second weight criteria. In such a scenario, the dynamic storage systems 106 may be used to store only those inventory items that satisfy the first weight criteria and the static storage systems 108 may be used to store the inventory items that satisfy the second weight criteria. For example, the dynamic storage systems 106 may be associated with the first weight criteria of 1 gram-2 kilogram (kg) and the static storage systems 108 may be associated with the second weight criteria of 2 kg and above. In such a scenario, a package of 10 shampoos weighing 1.5 kgs may be stored in one of the dynamic storage systems 106; however, a package of 20 shampoos weighing 3 kgs may be stored in a tote in one of the static storage systems 108.

In an embodiment, different types of the same inventory item may be stored adjacent to each other in the dynamic storage systems 106 and the static storage systems 108. In an exemplary scenario, the first tote may be placed adjacent to (or besides) the second tote on a same shelf of one of the static storage systems 108 when the first tote has an inventory item of a first type stored therein and the second tote has the inventory item of a second type stored therein. In an example, the inventory item in the first tote may correspond to a microwave of a first brand and the inventory item in the second tote may correspond to a microwave of second brand that is different from the first brand. The system environment 100 thus enables storage of different brands of the same inventory item in a single dynamic storage system or a single static storage system.

In an embodiment, the dynamic storage systems 106 and the static storage systems 108 may have an identical shelf size and layout. In another embodiment, the dynamic storage systems 106 and the static storage systems 108 may have different shelf sizes and layouts.

The first robotic apparatus **112*a* is a robotic vehicle that moves within the storage facility 102. For example, the first robotic apparatus 112*a* may be an automatic guided vehicle (AGV) that is responsive to commands received from the control server 116. The first robotic apparatus 112*a* may include suitable logic, instructions, circuitry, interfaces, and/or codes, executable by the circuitry, for transporting payloads (e.g., the dynamic storage systems 106) in the storage facility 102 based on the commands received from the control server 116. For example, the first robotic apparatus 112*a* may carry and transport the dynamic storage systems 106 from the storage area 104 to the PPS 120 at the order fulfilment and replenishment location for fulfillment of orders, replenishment of inventory stock, and rotation of the inventory stock. The first robotic apparatus 112*a* may be configured to read the fiducial markers on the working floor of the storage facility 102 or a surface of at least one of the dynamic storage systems 106. The first robotic apparatus 112***a* may include various sensors (e.g., image sensors, RFID sensors, and/or the like) for reading the fiducial markers. The first robotic apparatus 112*a* may utilize the fiducial markers for determining a relative position of the first robotic apparatus 112*a* within the storage facility 102 and/or identifying at least one of the dynamic storage systems 106. For the sake of brevity, the storage facility 102 is shown to have the first robotic apparatus 112*a*. It will be apparent to those of skill in the art that the storage facility 102 may include any number of robotic apparatuses without deviating from the scope of the disclosure.

In an embodiment, the first robotic apparatus 112*a* may travel through the aisles of the static storage systems 108 to carry the dynamic storage systems 106 to and from corresponding resting area beneath the static storage systems 108. In another embodiment, the first robotic apparatus 112*a* may have resting area beneath corresponding static storage systems 108. Therefore, the first robotic apparatus 112*a* may travel via the aisles of the static storage systems 108 to reach their corresponding resting area.

The second robotic apparatus 114*a* refers to an autonomous robotic vehicle that is enabled to move in the storage facility 102. The second robotic apparatus 114*a* may be configured to follow a dynamic path or a fixed predetermined path. The second robotic apparatus 114*a* may have a plurality of sensors (for example, a proximity sensor, a photosensor, or the like) that enables them to understand and interpret its surrounding. The second robotic apparatus 114*a* may have an adjustable height to access topmost shelves as well as base shelves of the static storage systems 108. The second robotic apparatus 114*a* may be communicably coupled to the control server 116. For example, the second robotic apparatus 114*a* may be responsive to commands received from the control server 116. The second robotic apparatus 114*a* may include suitable logic, instructions, circuitry, interfaces, and/or codes, executable by the circuitry, for transporting payloads (e.g., the first set of totes) between the static storage systems 108 and the PPS 120 based on the commands received from the control server 116. For example, the second robotic apparatus 114*a* may carry and transport a tore from the storage area 104 to the PPS 120 at the order fulfilment and replenishment location for fulfillment of orders, replenishment of inventory stock in the first set of totes, and rotation of the inventory stock.

In an embodiment, the storage area 104 may be segregated into various zones or departments based on one or more criteria, such as type of items, temperature, or the like. Inventory items may be stored in at least one of the dynamic storage systems 106 and the static storage systems 108 based on a storage requirement of corresponding inventory item. In such an embodiment, perishable and non-perishable inventory items may be stored in different sections of the storage area 104 based on its respective storage requirements. In an example, the dynamic storage systems 106 may be maintained at room temperature, thus inventory items that are required to be stored at the room temperature are stored in the dynamic storage systems 106. The static storage systems 108 may be maintained at a temperature that is lower or greater than the room temperature, thus inventory items that are required to be stored at temperatures different from the room temperature are stored in the static storage systems 108.

In an embodiment, the storage facility 102 may be fully automated (i.e., dark store) that does not require human assistance. In such an embodiment, a movement of inventory items within the storage facility 102 may be performed by the first robotic apparatus 112*a*, the second robotic apparatus 114*a*, or any other type of automated robotic assembly.

It may be apparent to a person skilled in the art that the embodiments described herein are exemplary and do not restrict the scope of the disclosure. In other embodiments, the inventory items may be stored in the dynamic storage systems 106 and the static storage systems 108 based on any other storage arrangement.

The PPS 120 may refer to a platform or a station at the order fulfilment and replenishment location where pick put operations are performed on the inventory items for quality assurance, order consolidation, stock replenishment, inventory rotation, or the like. In other words, the PPS 120 may serve as an interface for order consolidation as well as inventory item rotation among the dynamic storage systems 106 and the static storage systems 108. The PPS 120 may include multiple conveyor arrangements and may be operated by manual operators, robotic operators, and/or a combination thereof. One or more operations to be carried out at the PPS 120 may be manual, semi-automatic, or automatic. In an embodiment, the PPS 120 may include a HAIPORT 126 that includes multiple conveyor belts, for example, a first conveyor belt and a second conveyor belt. The first conveyor belt may be dedicated to movement of one or more inventory items and/or totes filled with inventory items, required for order fulfillment, packaging, and delivery. The second conveyor belt may be dedicated to movement of one or more inventory items and/or totes for storage within the storage area 104. An individual operator or a robotic arrangement (e.g., a robotic arm) may pick/put the inventory items to/from one of the first and second conveyor belts. It will be apparent to a person of ordinary skill in the art that the HAIPORT 126 may include any number of conveyor belts dedicated for specific operations. The PPS 120 may further include the display 124 that presents details of the order. The PPS 120 may further have a platform 127 where picked inventory items or totes are placed instead of the HAIPORT 126 for order consolidation and replenishment operations.

The delivery station 122 may serve as an interface between the storage facility 102 and one or more customers or delivery executives. In one embodiment, the delivery station 122 may be a click and collect (C&C) facility that allows users to place orders online via an online interface and then collect consolidated orders from the delivery station 122. In one embodiment, after packaging, the consolidated order may be stored in one of the dynamic storage systems 106, the static storage systems 108, and/or the delivery station 122 depending upon a time to delivery or collection. At the time of order collection, the packaged order may be brought to the delivery station 122 from the storage, or the user (or a delivery operator) may collect the packaged order from the delivery station 122 using an identification code.

The delivery station 122 may be a curbside kiosk or a curbside locker. In an embodiment, the storage facility 102 may be associated with a click and collect (C&C) center having the delivery station 122. The delivery station 122 may include an interactive interface 128 that may be used by an individual for placing an order or collecting a placed order. Based on the placement of the order, the control server 116 may initiate the process of order consolidation (as described in the foregoing). Upon order consolidation, the control server 116 may instruct the second robotic apparatus 114*a* to transport the consolidated order to the delivery station 122 and store in a locker assigned to the order. The individual may access the locker for collecting the consolidated order.

In an embodiment, multiple storage facilities similar to the storage facility 102 may be associated with a business. In such a scenario, inventory items may be moved across such storage facilities to ensure that an order of an individual is consolidated at one place. Such different storage facilities may be interconnected by various means of transport that enable movement of inventory items across facilities. For example, an individual may place an order for two items that are available at two different storage facilities. In such a scenario, one item may be moved from one storage facility to the other so that an entire order could be consolidated at one place, thereby enabling the individual or a delivery personnel to collect the entire order from one location.

The control server 116 may include suitable logic, circuitry, interfaces, and/or code, executable by the circuitry, to facilitate various inventory management operations in the storage facility 102. Examples of the control server 116 may include, but are not limited to, personal computers, laptops, mini-computers, mainframe computers, any non-transient and tangible machine that can execute a machine-readable code, cloud-based servers, distributed server networks, or a network of computer systems. The control server 116 may be realized through various web-based technologies such as, but not limited to, a Java web-framework, a .NET framework, a personal home page (PHP) framework, or any other web-application framework. The control server 116 may be maintained by a storage facility management authority or a third-party entity that facilitates inventory management and handling operations for the storage facility 102. It will be understood by a person having ordinary skill in the art that the control server 116 may execute other storage facility management operations as well along with the inventory management operations.

The control server 116 may be configured to map a first inventory item to one of the static storage systems 108 and the dynamic storage systems 106 for storage based on multiple factors. The factors may include a first transportation time of the second robotic apparatus 114*a* to transport a tote between one of the static storage systems 108 to the PPS 120 at the order fulfilment and replenishment location, a second transportation time of the first robotic apparatus 112*a* to transport one of the dynamic storage systems 106 to the PPS 120 at the order fulfilment and replenishment location, and a set of attributes of the first inventory item. The time required to transport totes from one of the static storage systems 108 to the PPS 120 is greater than the time required to transport one of the dynamic storage systems 106 to the PPS 120 when one of the dynamic storage systems 106 that is to be transported and one of the static storage systems 108 storing the totes that are to be transported are present at the same location. Thus, for faster consolidation of inventory items, the control server 116 may map inventory items to one of the dynamic storage systems 106 thereby having less transportation time. In addition, inventory items that do not require faster consolidation owing to lower consumption rates may be mapped to one of the static storage systems 108. Moreover, the control server 116 may rearrange the placement of the inventory items between the static storage systems 108 and the dynamic storage systems 106 based on the dynamically changing consumption rates of the inventory items.

The set of attributes based on which the control server 116 maps the first inventory item may include a size of the first inventory item, a weight of the first inventory item, a shape of the first inventory item, a number of units of the first inventory item, a consumption rate of the first inventory item, storage requirements, and a compatibility of the first inventory item with one or more inventory items previously stored in the static storage systems 108 and the dynamic storage systems 106. In an example, inventory items such as nuts and bolts may be required to be stored in the first set of totes owing to small size and high density, and hence the control server 116 may map nuts and bolts to one of the static storage systems 108 for storage in the first set of totes whereas printers may be mapped to one of the dynamic storage systems 106 for storage. In another example, if the inventory item is circular in shape and is required to be stored in another tote, the control server 116 may map the inventory item to one of the static storage systems 108 for storage in the other tote, whereas if the inventory item is rectangular in shape and can be directly stored on a shelf, the control server 116 may map the inventory item to one of the dynamic storage systems 106. In another example, a compatibility (or affinity) of the first inventory item is determined. For example, the first inventory item may include 5 bottles of a floor cleaning detergent which may not be compatible with groceries and apparels for storage. In such a scenario, if the dynamic storage systems 106 store groceries and apparels, the control server 116 may map the first inventory item to one of the static storage systems 108 for storage in other totes.

The control server 116 may further control one of the second robotic apparatus 114*a* to store the inventory item in one of the first set of totes based on the mapping of the first inventory item to the first static storage system 108*a* or the first robotic apparatus 112*a* to store the first inventory item in the first dynamic storage system 106*a* based on the mapping of the first inventory item to the first dynamic storage system 106*a*.

In an exemplary scenario, the control server 116 may have mapped the first inventory item to the first dynamic storage system 106*a*. In such a scenario, the control server 116 may instruct the first robotic apparatus 112*a* to reach a location of the first dynamic storage system 106*a*, identify the first dynamic storage system 106*a* based on the reference marker, align beneath the first dynamic storage system 106*a*, and lift and transport the first dynamic storage system 106*a* from the storage area 104 to the PPS 120. When the first robotic apparatus 112*a* transports the first dynamic storage system 106*a* to the PPS 120, an operator (a robotic assembly or a human operator) at the PPS 120 may pick various units of the first inventory item, place the picked units of the first inventory item on a shelf of the first dynamic storage system 106*a*, and scan the reference marker of the shelf using a scanner for storage confirmation. Once the pick/put operations for the storage of the first inventory item are complete, the control server 116 may instruct the first robotic apparatus 112*a* to transport the first dynamic storage system 106*a* from the PPS 120 the storage area 104. Thus, the control server 116 controls a movement of the first robotic apparatus 112*a* to store the first inventory item in the first dynamic storage system 106*a* based on the mapping of the first inventory item to the first dynamic storage system 106*a*.

In an alternate exemplary scenario, the control server 116 may have mapped the first inventory item to the first static storage system 108*a*. In such a scenario, the control server 116 may instruct the second robotic apparatus 114*a* to reach the PPS 120, pick a tote having the units of the first inventory item stored therein, transport the picked tote to a location of the first static storage system 108*a*, and place the picked tote on a shelf of the first static storage system 108*a*.

Based on the instructions, the second robotic apparatus 114*a* reaches the PPS 120, picks the tote having the units of the first inventory item stored therein, transports the picked tote to the location of the first static storage system 108*a*, and places the picked tote on the designated shelf of the first static storage system 108*a*. Thus, the control server 116 controls a movement of the second robotic apparatus 114*a* to store the first inventory item in the first static storage system 108*a* based on the mapping of the first inventory item to the first static storage system 108*a*.

The control server 116 is further configured to change the mapping of the first inventory item based on a change in at least one attribute of the set of attributes of the first inventory item. For example, consumption rate of apparels depends on season. In summer season, woolen apparels have lower consumption rate as compared to cotton-based apparels. In such a scenario, in summer season, the woolen clothes may be mapped to the static storage systems 108 and the cotton-based apparels may be mapped to the dynamic storage systems 106. However, when the season changes to winters, the consumption rate of the woolen apparels becomes greater than the consumption rate of the cotton-based apparels. In such a scenario, the control server 116 may change the mapping of the woolen apparels from the static storage systems 108 to the dynamic storage systems 106 when the consumption rate of the woolen apparels becomes greater than the consumption rate of the cotton-based apparels. In other words, the control server 116 changes the mapping of the first inventory item from the first static storage system 108*a* to the first dynamic storage system 106*a* based on a consumption rate of the first inventory item exceeding a threshold consumption rate. Further, the control server 116 changes the mapping of the first inventory item from the first dynamic storage system 106*a* to the first static storage system 108*a* based on a consumption rate of the first inventory item falling below the threshold consumption rate.

In another example, the first inventory item is a hair conditioner and may be currently mapped to one of the dynamic storage systems 106 for storage. If the control server 116 determines that the consumption rate of the hair conditioner is falling below the threshold consumption rate (say less than 50 units per month), the control server 116 changes the mapping of the hair conditioner from one of the dynamic storage systems 106 to one of the static storage systems 108.

In yet another example, the control server 116 may have mapped a plastic packing of nuts and bolts to one of the dynamic storage systems 106. However, loose nuts and bolts may be mapped to one of the static storage systems 106 for storage. Therefore, when the plastic packing of the nuts and bolts is opened to fulfill an order, the remaining nuts and bolts are re-mapped to one of the static storage systems 108 for storage in totes. Thus, the control server 116 enables rotation of the inventory items across different storage automations (such as the dynamic storage systems 106 and the static storage systems 108).

In an exemplary scenario, the consumption rate of the first inventory item stored in the first static storage system 108*a* may increase from the range $C_2$-$C_3$ to the range $C_1$-$C_2$. In such a scenario, one or more totes of the first inventory item are to be relocated from the first static storage system 108*a* to one of the dynamic storage systems 106. The control server 116 may select the second robotic apparatus 114*a* to transport the totes of the first inventory item from the first static storage system 108*a* to the PPS 120 in the storage facility 102. Thus, the second robotic apparatus 114a may travel to the location of the first static storage system 108*a*, identify the first static storage system 108*a* and the required totes. Based on a successful identification, the second robotic apparatus 114*a* may pick the required totes using corresponding robotic arm(s). In an embodiment, the robotic arm(s) of the second robotic apparatus 114*a* may be controlled by the control server 116. After retrieving the required totes, the second robotic apparatus 114*a* may reach the PPS 120 based on transit instructions received from the control server 116. Upon reaching the PPS 120, the second robotic apparatus 114*a* may be further configured to place the picked totes at a destination spot, for example, the HAIPORT 126 or the platform 127. The operator (a robotic assembly or a human operator) at the HAIPORT 126 or the platform 127 may pick the totes including the first inventory item and scan them using a scanner for confirmation. Based on scanning of the totes, the control server 116 may recognize a movement of the totes from the first static storage system 108*a* to one of the dynamic storage systems 106. The totes may be picked from the HAIPORT 126 or the platform 127 by the operator at the PPS 120 and may be stored in one of the dynamic storage systems 106 waiting at the PPS 120. Thus, the control server 116 enables rotation of the inventory items across different storage automations (such as the dynamic storage systems 106 and the static storage systems 108) based on a consumption rate or any other storage plan.

The control server 116 is further configured to change the mapping of the first inventory item based on a change in at least one attribute of the set of attributes of the first inventory item. For example, a consumption rate of apparels depends on season. In summer season, woolen apparels have lower consumption rate as compared to cotton-based apparels. In such a scenario, in summer season, the woolen clothes may be mapped to the static storage systems 108 and the cotton-based apparels may be mapped to the dynamic storage systems 106. However, when the season changes to winters, the consumption rate of the woolen apparels becomes greater than the consumption rate of the cotton-based apparels. In such a scenario, the control server 116 may change the mapping of the woolen apparels from the static storage systems 108 to the dynamic storage systems 106 when the consumption rate of the woolen apparels becomes greater than the consumption rate of the cotton-based apparels. In other words, the control server 116 changes the mapping of the first inventory item from the first static storage system 108*a* to the first dynamic storage system 106*a* based on a consumption rate of the first inventory item exceeding a threshold consumption rate. Further, the control server 116 changes the mapping of the first inventory item from the first dynamic storage system 106*a* to the first static storage system 108*a* based on the consumption rate of the first inventory item falling below the threshold consumption rate.

The control server 116 may be further configured to instruct the second robotic apparatus 114*a* to change a placement order of the first set of totes in the static storage systems 108. In an example, the first tote and the second tote may be stored in the first static storage system 108*a*. The first tote may store a second inventory item and the second tote placed behind the first tote on the same shelf as the first tote may store a third inventory item. The control server 116 may determine a consumption rate of each of the second inventory item and the third inventory item. Based on the determination, the control server 116 may be further configured to instruct the second robotic apparatus 114*a* to change a placement order of the first tote and the second tote such that the second tote is now placed in front of the first tote based on the consumption rate of the third inventory item exceeding the consumption rate of the second inventory item. In other words, the control server 116 may instruct the second robotic apparatus 114*a* to change the placement order of totes stored as per N-deep storage configuration when consumption rates of the inventory items change.

The control server 116 may be further configured to enable order consolidation. The control server 116 receives a service request associated with an order for multiple inventory items, for example, first and second inventory items. Based on the service request, the control server 116 may be configured to identify current storage locations of the first and second inventory items in the storage area 104. In an example, the control server 116 may identify that the first inventory item of the order is stored at the first dynamic storage system 106*a* and the second inventory item of the order is stored in the first tote placed on a shelf of the first static storage system 108*a*. The first tote may be a box, a carton, a flexible container, or the like that is used to hold multiple units of the second inventory item. Thus, for the retrieval of the first inventory item, the first dynamic storage system 106*a* is required to be transported from a first location to the order fulfilment and replenishment location in the storage facility 102. The control server 116 is further configured to control a movement of the first robotic apparatus 112*a* to transport the first dynamic storage system 106*a* to the order fulfilment and replenishment location and a movement of the second robotic apparatus 114*a* to transport the first tote from the first static storage system 108*a* to the order fulfilment and replenishment location. The control server 116 may select a robotic apparatus such as the first robotic apparatus 112*a* that is available for transporting the first dynamic storage system 106*a* and the second robotic apparatus 114*a* that is available for transporting the first tote.

The control server 116 may further determine a first optimal path in the storage facility 102 that is to be traversed by the first robotic apparatus 112*a* for reaching the first location, where the first dynamic storage system 106*a* is positioned, from its current location. The current location of the first dynamic storage system 106*a* may be beneath the first static storage system 108*a*. The control server 116 may further determine a second optimal path in the storage facility 102 that is to be traversed by the first robotic apparatus 112*a* for reaching the second location (e.g., the order fulfilment and replenishment location 120) from the first location, after lifting the second dynamic storage system 106*b*. The control server 116 may then communicate transit instructions to the first robotic apparatus 112*a*. The transit instructions may include path details of the first and second optimal paths, details of the reference marker of the first dynamic storage system 106*a*, or the like.

Based on the transit instructions, the first robotic apparatus 112*a* may reach the first location from its current location, align beneath the first dynamic storage system 106*a*, and scan a reference marker marked at a surface of the first dynamic storage system 106*a* to identify the first dynamic storage system 106*a* for transportation. Based on a correct identification, the first robotic apparatus 112*a* may engage with the first dynamic storage system 106*a*. Upon engaging with the first dynamic storage system 106*a*, the first robotic apparatus 112*a* may lift the first dynamic storage system 106*a*. The control server 116 may be further configured to navigate the first robotic apparatus 112*a* from the first location to the second location for transporting the first dynamic storage system 106*a*. The first robotic apparatus 112*a* may disengage with the first dynamic storage system 106*a* upon reaching the second location (i.e., the order fulfilment and replenishment location). When the first dynamic storage system 106*a* is placed at the second location, the first inventory item may be retrieved from the first dynamic storage system 106*a* and placed at a destination spot. The retrieval of the first inventory item from the first dynamic storage system 106*a* may be performed automatically, semi-automatically, or manually.

To transport the first tote, the control server 116 may select the second robotic apparatus 114*a* that is available. The second robotic apparatus 114*a* may travel from its current location to the location of the first static storage system 108*a* based on transit instructions provided by the control server 116. The second robotic apparatus 114*a* may be further configured to identify the first static storage system 108*a* by scanning a marker present on a surface of the first static storage system 108*a*. Based on identification of the first static storage system 108*a*, the second robotic apparatus 114*a* may identify the first tote stored in the first static storage system 108*a* based on a marker (for example, a number, a bar code, a QR code) present on a surface of the first tote. The second robotic apparatus 114*a* may pick the first tote based on a successful identification. The second robotic apparatus 114*a* may be further configured to transport the first tote to the second location based on navigation information provided by the control server 116. Upon reaching the second location, the second robotic apparatus 114*a* may be configured to place the first tote at the destination spot described in the transit instructions to complete the transportation of the first tote.

In one example, the destination spot where the first inventory item and the first tote are placed may correspond to the platform 127. An operator (a robotic assembly or a human operator) at the platform 127 may pick the first inventory item and required second inventory item from the first tote as described in the order. Based on scanning of the picked units of the second inventory item, the control server 116 may be configured to determine a movement of the second inventory item from the first tote. The picked units of the first and second inventory items may be placed by the operator for packaging and delivery. Upon retrieval of the second inventory item from the first tote, the first tote including the remaining units of the second inventory item is picked by the second robotic apparatus 114*a* as instructed by the control server 116 for storing in one of the static storage systems 108.

The retrieved units of the first and second inventory items are then consolidated and packaged. In an embodiment, order consolidation and packaging may be an automatic activity that does not require human assistance. In another embodiment, order consolidation and packaging may be a semi-automatic activity that requires human assistance and robotic assemblies. In another embodiment, order consolidation and packaging may be a manual activity that requires human assistance.

Figure 2:
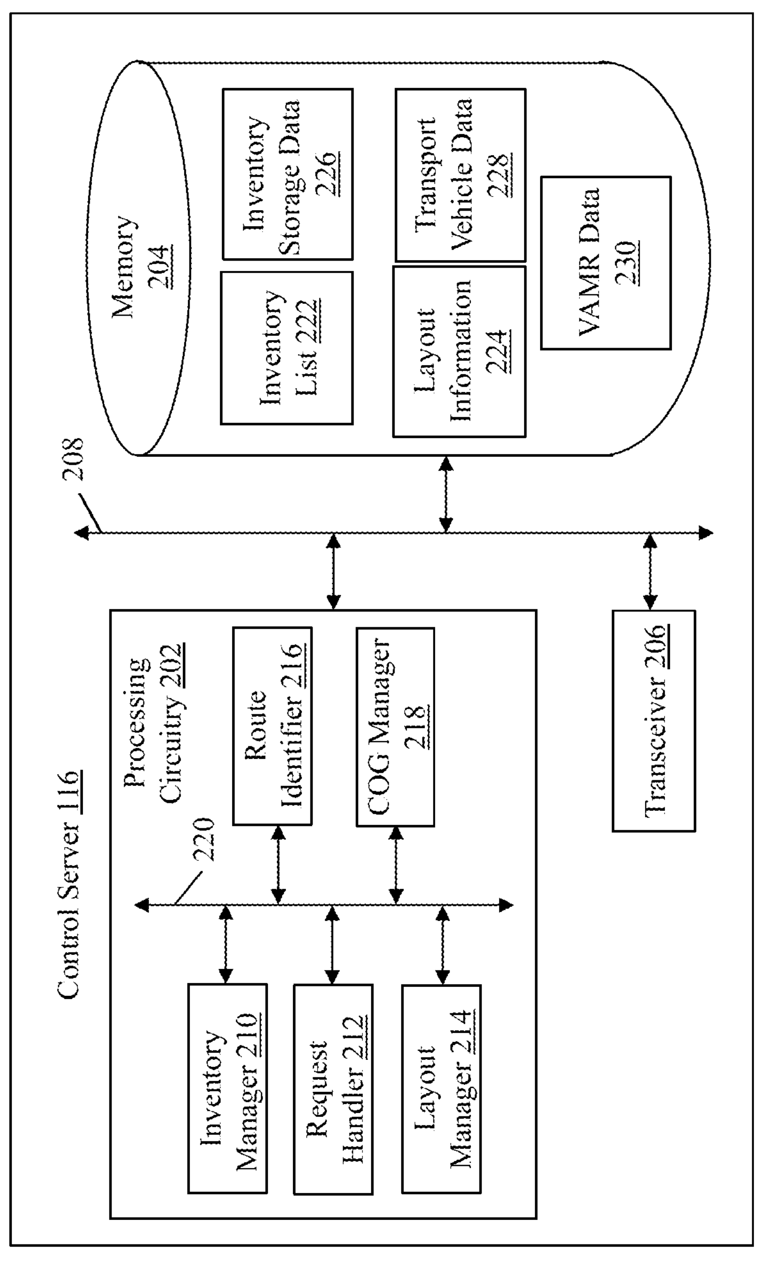
FIG. 2 is a block diagram that illustrates a control server, in accordance with an exemplary embodiment of the disclosure.

FIG. 2 is a block diagram of the control server 116, in accordance with an exemplary embodiment of the disclosure. The control server 116 includes a processing circuitry 202, a memory 204, and a transceiver 206 that communicate with each other by way of a first communication bus 208. The processing circuitry 202 includes an inventory manager 210, a request handler 212, a layout manager 214, a route identifier 216, and a COG (center of gravity) manager 218 that communicate with each other by way of a second communication bus 220. It will be apparent to a person of ordinary skill in the art that the control server 116 is for illustrative purposes and not limited to any specific combination or hardware circuitry and/or software. For example, the control server 116 may be implemented by a server system that includes a plurality of servers each configured to perform one or a combination of the functions of the server. Furthermore, the control server 116 may be implemented by a plurality of devices that are operating over a cloud and communicating with devices in the storage facility 102 via the communication network 118.

The processing circuitry 202 includes suitable logic, circuitry, interfaces, and/or code, executed by the circuitry, for executing various operations, such as the inventory management operations, warehouse management operations, procurement operations, COG maintenance operations, or the like. The processing circuitry 202 may be configured to determine the position of the COGs of the dynamic storage systems 106, actuate an interlocking mechanism of the first robotic apparatus 112*a* remotely, and control navigation of the first robotic apparatus 112*a* and the second robotic apparatus 114*a*. The processing circuitry 202 may execute the operations by way of the inventory manager 210, the request handler 212, the layout manager 214, the route identifier 216, and the COG manager 218. Examples of the processing circuitry 202 include, but are not limited to, an application-specific integrated circuit (ASIC) processor, a reduced instruction set computing (RISC) processor, a complex instruction set computing (CISC) processor, a field-programmable gate array (FPGA), and the like.

The memory 204 includes suitable logic, circuitry, interfaces, and/or code, executed by the circuitry, to store an inventory list 222, layout information 224, inventory storage data 226, robotic apparatus data 228, and VAMR data 230. Examples of the memory 204 include, but are not limited to, a random-access memory (RAM), a read-only memory (ROM), a removable storage drive, a hard disk drive (HDD), a flash memory, a solid-state memory, and the like. In one embodiment, the memory 204 may be realized through various database technologies such as, but not limited to, Microsoft® SQL, Oracle®, IBM DB2®, Microsoft Access®, PostgreSQL®, MySQL®, and SQLite®. It will be apparent to a person skilled in the art that the scope of the disclosure is not limited to realizing the memory 204 in the control server 116, as described herein. In other embodiments, the memory 204 may be realized in the form of an external database server or a cloud storage working in conjunction with the control server 116, without departing from the scope of the disclosure.

The inventory list 222 may include the list of inventory items and packages stored in the storage facility 102 and the number of units of each inventory item stored in the storage facility 102. The layout information 224 may include information regarding the layout of the storage facility 102, such as location data of the dynamic storage systems 106 and the static storage systems 108. The layout information 224 may further include real-time path availability information of various paths in the storage facility 102. For example, a first path in the storage facility 102 may be under maintenance and hence is unavailable for traversing.

The inventory storage data 226 is indicative of storage locations of the inventory items stored in the dynamic storage systems 106 and the static storage systems 108. The inventory storage data 226 further includes the reference markers of the dynamic storage systems 106 and the static storage systems 108. The reference identifiers are unique codes assigned to each of the dynamic storage systems 106 and the static storage systems 108. In one example, the reference markers are radio frequency identification (RFID) tags that are readable by the first robotic apparatus 112*a*. Thus, based on the inventory storage data 226, the control server 116 is aware of the locations of all inventory items stored in the storage facility 102. The inventory storage data 226 further includes details of the current positions of the COGs of the dynamic storage systems 106.

The robotic apparatus data 228 is indicative of details of the first robotic apparatus 112*a* available in the storage facility 102. The details of the first robotic apparatus 112*a* may include weight lifting capacity, size, and dimension criteria of the first robotic apparatus 112*a*. The robotic apparatus data 228 may further include a current location and a current status of the first robotic apparatus 112*a*. The current status of the first robotic apparatus 112*a* may include "AVAILABLE", "RESTING", "DOWNTIME", and "OCCUPIED".

The VAMR data 230 is indicative of details of the second robotic apparatus 114*a* available in the storage facility 102. The details of the second robotic apparatus 114*a* may include weight lifting capacity, size, and dimension criteria of the second robotic apparatus 114. The second robotic apparatus data 230 may further include a current location and a current status of the second robotic apparatus 114*a*. The current status of the second robotic apparatus 114*a* may include "AVAILABLE", "RESTING", "DOWNTIME", and "OCCUPIED".

The transceiver 206 transmits and receives data over the communication network 118 using one or more communication network protocols. The transceiver 206 transmits various requests and messages to at least one of the first robotic apparatus 112*a* and the second robotic apparatus 114*a* and receives requests and messages from at least one of the first robotic apparatus 112*a* and the second robotic apparatus 114*a*. Examples of the transceiver 206 include, but are not limited to, an antenna, a radio frequency transceiver, a wireless transceiver, a Bluetooth transceiver, an ethernet based transceiver, a USB transceiver, or any other device configured to transmit and receive data.

The inventory manager 210 manages the inventory list 222 stored in the memory 204. For example, the inventory manager 210 adds new inventory items to the inventory list 222 when the new inventory items are stored in the storage facility 102 and updates the inventory list 222 based on various service requests. The inventory manager 210 uses the inventory list 222 for consolidation of inventory items for fulfillment of orders. The inventory manager 210 further determines storage location of an inventory item based on the storage plan. In other words, the inventory manager 210 determines whether the inventory item needs to be relocated based on one of its current storage requirement and consumption rate, or for replenishment of a storage system.

The request handler 212 processes all the service requests received from external communication system and stores a record (i.e., the historical request data) of all historical service requests in the memory 204. In one embodiment, the request handler 212 merges one or more service requests to optimize operations in the storage facility 102. The request handler 212 processes the service request to determine a storage location of inventory items included in the order. The layout manager 214 manages the layout information 224. For example, if there is any change in the layout of the storage facility 102 (such as a change in the arrangement of the dynamic storage systems 106 and the static storage systems 108), the layout manager 214 updates the layout information 224 based on the change in the layout.

The route identifier 216 is responsible for identifying optimal paths for the first robotic apparatus 112*a* and the second robotic apparatus 114*a*. The COG manager 218 determines the variation in the position of COG of all the dynamic storage systems 106. In one embodiment, based on the determination that the COG of the dynamic storage systems 106 may shift out of a COG tolerance region of the dynamic storage systems 106, the COG manager 218 may actuate the interlocking mechanism of corresponding robotic apparatus.

Though, the processing circuitry 202 is depicted as a hardware component in FIG. 2, a person skilled in the art will appreciate that the scope of the disclosure is not limited to realizing the processing circuitry 202 as the hardware component. In another embodiment, the functionality of the processing circuitry 202 may be implemented by way of a computer executable code or a set of computer readable instructions stored in the memory 204, without deviating from the spirit of the disclosure.

Figure 3A:
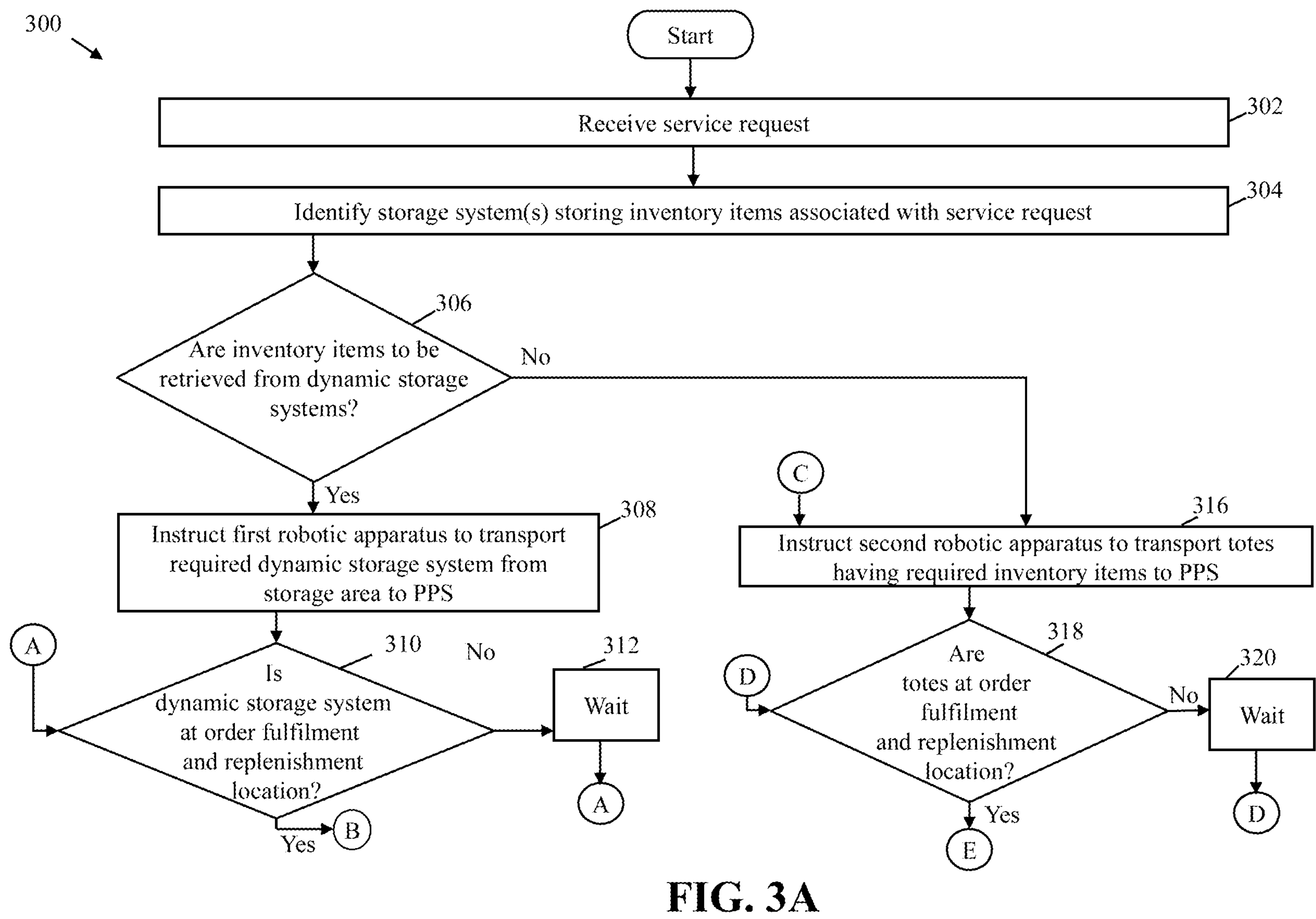
FIGS. 3A and 3B are flowcharts that collectively illustrate a method for managing inventory items within a storage facility, in accordance with an exemplary embodiment of the disclosure.
Figure 3B:
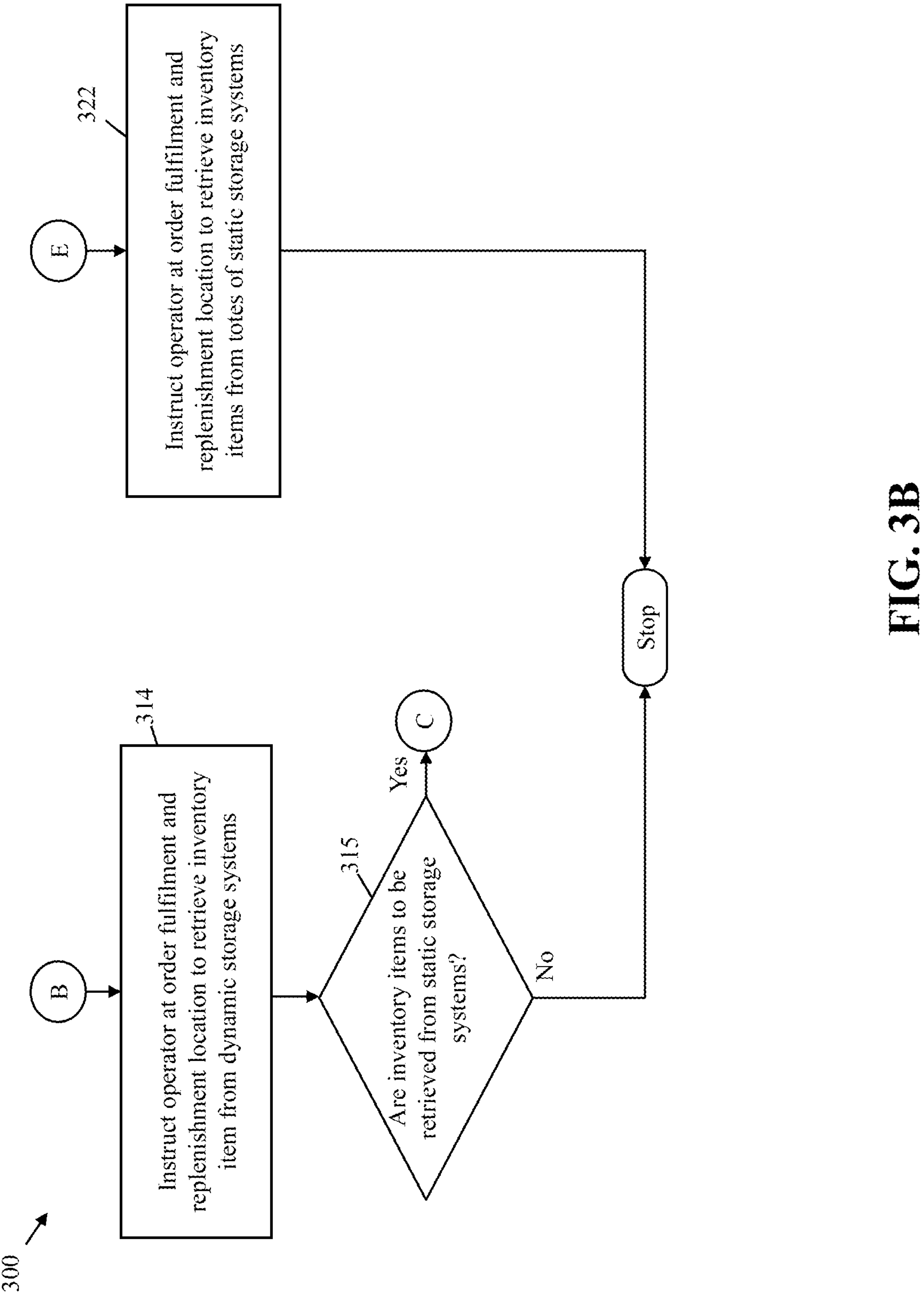

FIGS. 3A and 3B, collectively represent a flow chart 300 that illustrates a process (i.e., a method) for managing inventory items within a storage facility 102, in accordance with an exemplary embodiment of the disclosure.

Referring to FIG. 3A, the process may generally start at 302, where a service request is received. The control server 116 is configured to receive the service request. In one embodiment, the service request may correspond to an order placed by an individual or a relocation request of inventory items within the storage facility 102. The service request may be associated with one or more inventory items. For the sake of brevity, it is assumed that the service request is associated with an order.

The process proceeds to 304, where one or more storage systems storing the inventory items of the service request are identified. The control server 116 is configured to identify the one or more storage systems storing the inventory items of the service request.

The process proceeds to 306, where a check is performed to determine whether any inventory item is to be retrieved from one of the dynamic storage systems 106. The control server 116 is configured to perform the check to determine whether any inventory item is to be retrieved from one of the dynamic storage systems 106.

If at 306, the control server 116 determines that one or more inventory items are to be retrieved from one of the dynamic storage systems 106, the process proceeds to 308. At 308, the first robotic apparatus 112*a* is instructed to transport one of the required dynamic storage systems 106 from the storage area 104 to the order fulfilment and replenishment location in the storage facility 102. The control server 116 is configured to instruct the first robotic apparatus 112*a* by communicating the transit information for transporting one of the required dynamic storage systems 106 from the storage area 104 to the order fulfilment and replenishment location.

The process proceeds to 310, where a check is performed to determine whether one of the required dynamic storage systems 106 has reached the order fulfilment and replenishment location 120. The control server 116 is configured to perform the check to determine whether one of the required dynamic storage systems 106 has reached the order fulfilment and replenishment location 120. If at 310, the control server 116 determines that one of the required dynamic storage systems 106 has not reached the order fulfilment and replenishment location 120, the process proceeds to 312. At 312, the control server 116 is configured to wait for a predefined time interval (for example, 30 seconds, 1 minute, 2 minutes, or the like) and subsequently 310 is again executed. If at 310, the control server 116 determines that one of the required dynamic storage systems 106 has reached the order fulfilment and replenishment location 120, the process proceeds to B.

Referring to FIG. 3B, the process at B proceeds to 314, where the operator at the order fulfilment and replenishment location 120 is instructed to retrieve the required one or more inventory items from one of the required dynamic storage systems 106 for order consolidation. The control server 116 is configured to instruct the operator at the order fulfilment and replenishment location to retrieve the required one or more inventory items from one of the required dynamic storage systems 106. The operator may be a human operator or a robotic arrangement configured to perform retrieval of inventory items from one of the required dynamic storage systems 106. In an instance, when the operator is the human operator, the control server 116 may instruct the operator via the display 124. In another instance, when the operator is the robotic arrangement, the control server 116 may instruct the operator by communicating one or more instructions for retrieval of the required inventory items.

The process proceeds to 314, where the operator or an automated machine at the order fulfilment and replenishment location 120 is instructed to retrieve the required one or more inventory items from one of the required dynamic storage systems 106 for order consolidation. The control server 116 is configured to instruct the operator at the order fulfilment and replenishment location to retrieve the required one or more inventory items from one of the required dynamic storage systems 106. The operator may be a human operator or a robotic arrangement configured to perform retrieval of inventory items from one of the required dynamic storage systems 106. In an instance, when the operator is the human operator, the control server 116 may instruct the operator via the display 124. In another instance, when the operator is the robotic arrangement, the control server 116 may instruct the operator by communicating one or more instructions for retrieval of the required inventory items.

The process proceeds to 315, where a check is performed to determine whether any inventory item is to be retrieved from one of the static storage systems 108. The control server 116 is configured to perform the check to determine whether any inventory item is to be retrieved from one of the static storage systems 108.

If at 315, the control server 116 determines that no inventory item is to be retrieved from one of the static storage systems 108, the process proceeds to end. If at 315, the control server 116 determines that one or more inventory items are to be retrieved from one of the static storage systems 106, the process proceeds to 316 of FIG. 3A.

Referring back to FIG. 3A, if at 306, the control server 116 determines that the inventory items are not to be retrieved from one of the dynamic storage systems 106, it is thus determined that the inventory items are to be retrieved from one of the static storage systems 108 and the process proceeds to 316.

At 316, the second robotic apparatus 114*a* is instructed to transport the required totes from the one of the static storage systems 108 to the order fulfilment and replenishment location. The control server 116 is configured to instruct the second robotic apparatus 114*a* by communicating the transit information for transporting the required totes from the static storage systems 108 in the storage area 104 to the order fulfilment and replenishment location.

The process proceeds to 318, where a check is performed to determine whether the required totes has reached the order fulfilment and replenishment location. The control server 116 is configured to perform the check to determine whether the required totes have reached the order fulfilment and replenishment location.

If at 318, the control server 116 determines that the required totes have not reached the order fulfilment and replenishment location, the process proceeds to 320. At 320, the control server 116 is configured to wait for the predefined time interval and subsequently 318 is executed again.

If at 318, the control server 116 determines that the required totes have reached the order fulfilment and replenishment location, the process proceeds to 322.

Referring to FIG. 3B, at 322, the operator or an automated machine at the order fulfilment and replenishment location is instructed to retrieve the required inventory items from the totes. In an instance, when the second robotic apparatus 114*a* has bought the totes having the required inventory items, the operator may pick required units of the inventory items from the totes for order consolidation and fulfillment. The totes with the remaining inventory items may be transported back to the designated static storage systems 108 by the second robotic apparatus 114*a* as per instructions given by the control server 116.

Figure 4:
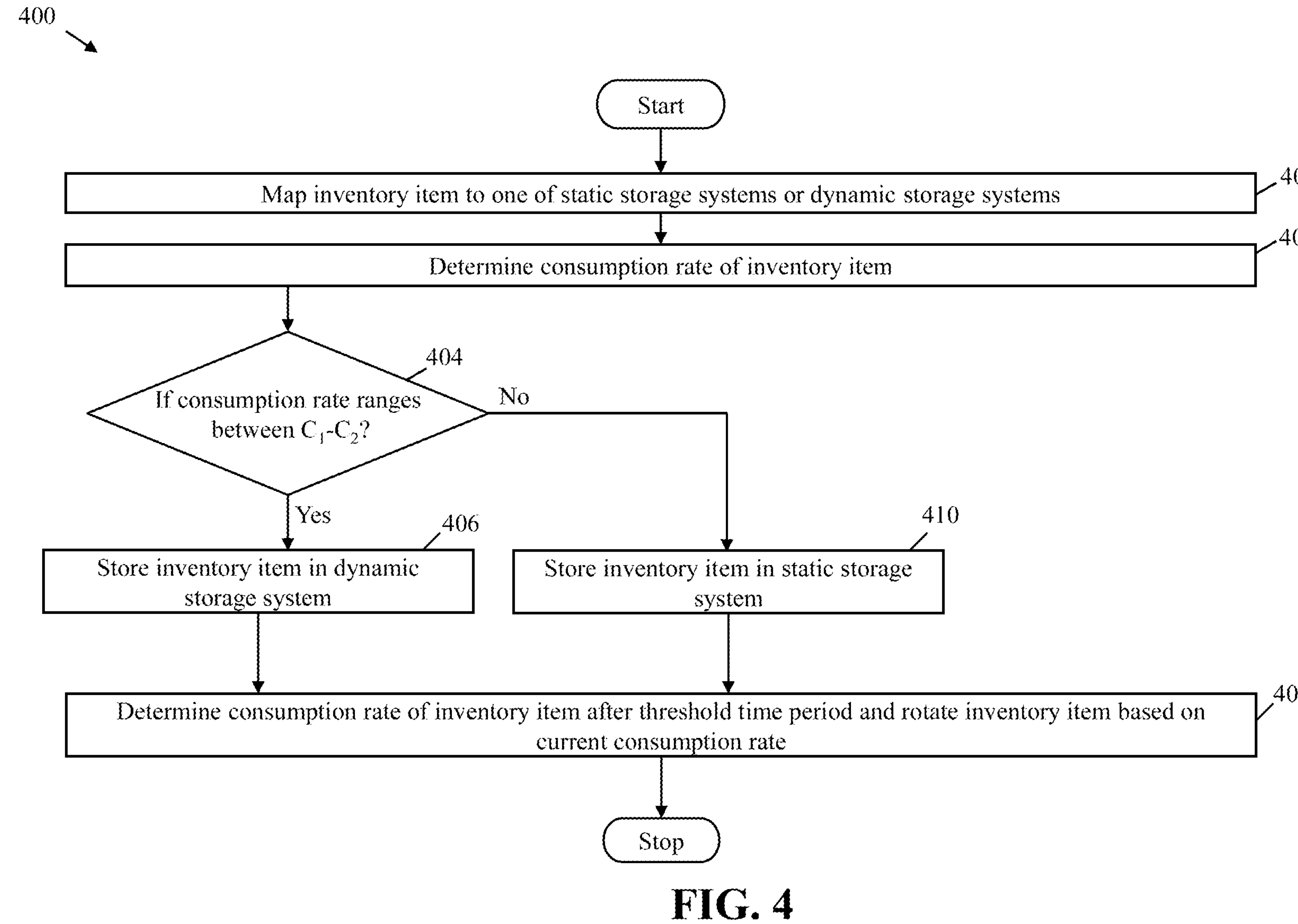
FIG. 4 is a flowchart that illustrates a method for storage of inventory items within a storage facility, in accordance with an exemplary embodiment of the disclosure.

FIG. 4 is a flow chart 400 that illustrates a process (i.e., a method) for storage of inventory items within the storage facility 102, in accordance with an exemplary embodiment of the disclosure. The process may generally start at 401, where the control server 116 may map the inventory item to one of the static storage systems 108 and the dynamic storage systems 106. The control server 116 may map the inventory item to one of the static storage systems 108 and the dynamic storage systems 106 based on (i) a first transportation time of the second robotic apparatus 114*a* to transport a tote of the first set of totes between the first static storage system 108*a* and the order fulfilment and replenishment location, (ii) a second transportation time of the first robotic apparatus 112*a* to transport the first dynamic storage system 106*a* to the order fulfilment and replenishment location, and (iii) the set of attributes of the inventory item.

The process proceeds to 402, where a consumption rate of the inventory item is determined. The control server 116 is configured to determine the consumption rate of the inventory item based on data associated with movement of the inventory item. The control server 116 may determine the consumption rate of the inventory item based on a count of units of the inventory item that are being moved out of the storage facility 102 during a first time-period (for example, a day, two days, a week, a month, or the like). The count of units of the inventory item moved out of the storage facility 102 being greater than a threshold value is indicative of a high consumption rate of the inventory item). The count of units of the inventory item moved out of the storage facility 102 being less than the threshold value may indicate a low consumption rate of the inventory item.

The process proceeds to 404, where the control server 116 determines whether the consumption rate of the inventory item ranges between $C_1$-$C_2$. If the consumption rate of the inventory item ranges between $C_1$-$C_2$, the process proceeds to 406.

At 406, the inventory item is stored in one of the dynamic storage systems 106. The control server 116 is configured to instruct the first robotic apparatus 112*a* to store the inventory item in one of the dynamic storage systems 106 having a vacant shelf for storing the inventory item.

The process proceeds to 408, where the consumption rate of the inventory item is determined again after a threshold time period. The threshold time period may be 24 hours, 48 hours, 72 hours, a week, a month, or the like. The inventory item may be rotated among the dynamic storage systems 106 and the static storage systems 108 based on its current consumption rate as described in the foregoing description of FIG. 1. The control server 116 is configured to determine the consumption rate of the inventory item after the threshold time period. The control server 116 is further configured to instruct the first robotic apparatus 112*a* or the second robotic apparatus 114*a* to rotate the inventory item in one of the dynamic storage systems 106 and the static storage systems 108 based on its current consumption rate using the order fulfilment and replenishment location as an interface for relocation. The control server 116 thus changes the mapping of the inventory item based on a change in at least one attribute of the set of attributes of the inventory item.

If at 404, the control server 116 determines that the consumption rate of the inventory item does not range between $C_1$-$C_2$, the process proceeds to 410.

At 410, the inventory item is stored in one of the static storage systems 108. The control server 116 is configured to instruct the second robotic apparatus 114*a* to one or more totes including the inventory item in one of the static storage systems 108 having a vacant shelf for storing the one or more totes of the inventory item. The process proceeds to 408.

Figure 5:
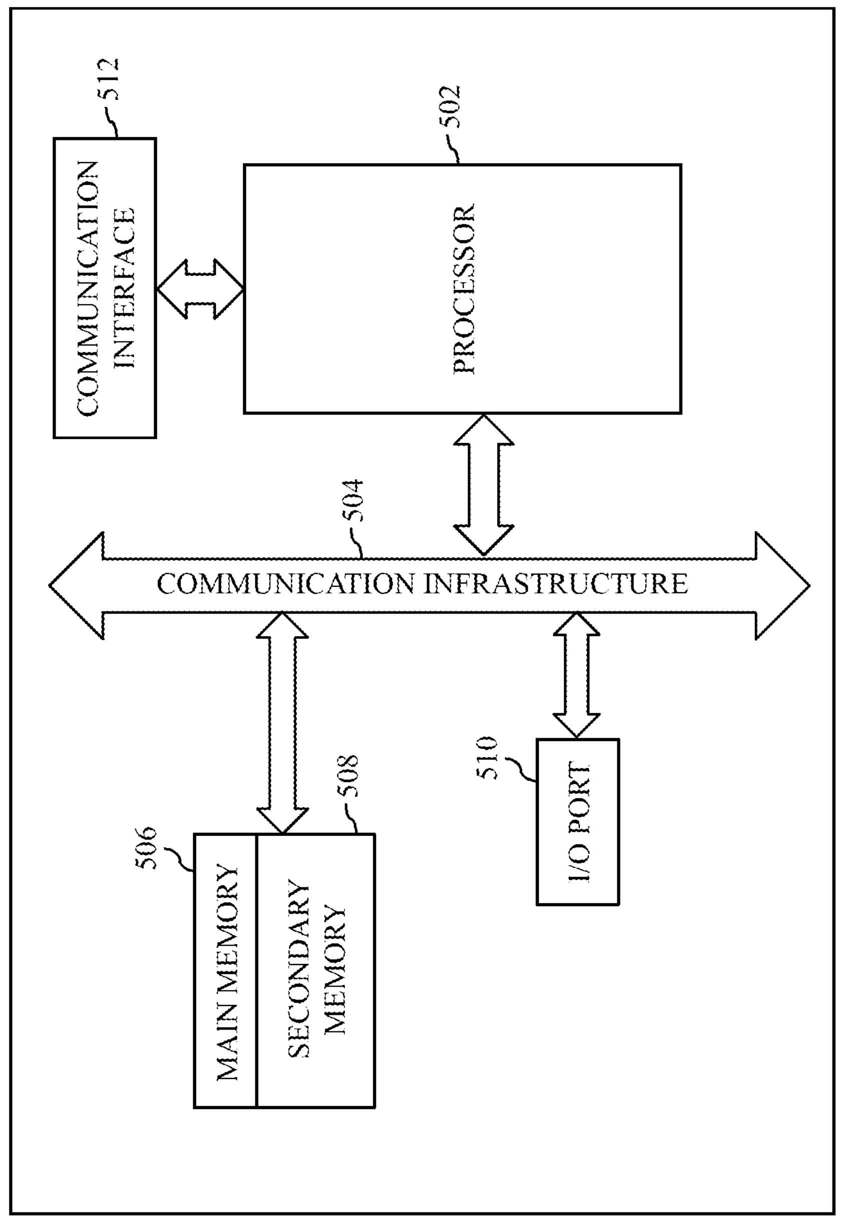
FIG. 5 is a block diagram that illustrates a system architecture of a computer system for management of inventory items within a storage facility, in accordance with an exemplary embodiment of the disclosure.
Figure 5:

FIG. 5 is a block diagram that illustrates a system architecture of a computer system 500 for managing inventory within the storage facility 102, in accordance with an exemplary embodiment of the disclosure. An embodiment of the disclosure, or portions thereof, may be implemented as computer-readable code on the computer system 500. In one example, the control server 116 of FIG. 1 may be implemented in the computer system 500 using hardware, software, firmware, non-transitory computer-readable media having instructions stored thereon, or a combination thereof and may be implemented in one or more computer systems or other processing systems. Hardware, software, or any combination thereof may embody modules and components used to implement the methods of FIGS. 3A, 3B, and 4.

The computer system 500 may include a processor 502 that may be a special purpose or a general-purpose processing device. The processor 502 may be a single processor or multiple processors. The processor 502 may have one or more processor "cores." Further, the processor 502 may be coupled to a communication infrastructure 504, such as a bus, a bridge, a message queue, the communication network 118, multi-core message-passing scheme, or the like. The computer system 500 may further include a main memory 506 and a secondary memory 508. Examples of the main memory 506 may include RAM, ROM, and the like. The secondary memory 508 may include a hard disk drive or a removable storage drive (not shown), such as a floppy disk drive, a magnetic tape drive, a compact disc, an optical disk drive, a flash memory, or the like. Further, the removable storage drive may read from and/or write to a removable storage device in a manner known in the art. In an embodiment, the removable storage system may be a non-transitory computer readable recording media.

The computer system 500 may further include an input/output (I/O) port 510 and a communication interface 512. The I/O port 510 may include various input and output devices that are configured to communicate with the processor 502. Examples of the input devices may include a keyboard, a mouse, a joystick, a touchscreen, a microphone, and the like. Examples of the output devices may include a display screen, a speaker, headphones, and the like. The communication interface 512 may be configured to allow data to be transferred between the computer system 500 and various devices that are communicatively coupled to the computer system 500. Examples of the communication interface 512 may include a modem, a network interface, i.e., an Ethernet card, a communication port, and the like. Data transferred via the communication interface 512 may be signals, such as electronic, electromagnetic, optical, or other signals as will be apparent to a person skilled in the art. The signals may travel via a communications channel, such as the communication network 118, which may be configured to transmit the signals to the various devices that are communicatively coupled to the computer system 500. Examples of the communication channel may include a wired, wireless, and/or optical medium such as cable, fiber optics, a phone line, a cellular phone link, a radio frequency link, and the like. The main memory 506 and the secondary memory 508 may refer to non-transitory computer readable mediums that may provide data that enables the computer system 500 to implement the methods illustrated in FIGS. 3A, 3B, and 4.

The disclosed embodiments encompass numerous advantages. Exemplary advantages of the disclosed methods include, but are not limited to, providing a single storage facility for storing inventory items with different storage requirements and consumption rates such that the inventory items are shuffled between the static storage systems 108 and the dynamic storage systems 106. The disclosed methods and systems allow for storing the inventory items while considering dynamic nature of its consumption and placing one of the dynamic storage systems 106 beneath one of the static storage systems 108 to reduce the transportation time of the inventory items. The disclosed methods and systems maximize utilization of a vertical space of the storage facility 102 which in turn improves space utilization within the storage facility 102. The disclosed methods and systems further optimize time and resources required for fulfilling an order of inventory items. The disclosed methods and systems also help in increasing the storage density in the storage facility. The disclosed methods and systems increase a throughput of the storage facility 102 as the inventory items require significantly less time to be retrieved.

A person of ordinary skill in the art will appreciate that embodiments and exemplary scenarios of the disclosed subject matter may be practiced with various computer system configurations, including multi-core multiprocessor systems, minicomputers, mainframe computers, computers linked or clustered with distributed functions, as well as pervasive or miniature computers that may be embedded into virtually any device. Further, the operations may be described as a sequential process, however some of the operations may in fact be performed in parallel, concurrently, and/or in a distributed environment, and with program code stored locally or remotely for access by single or multiprocessor machines. In addition, in some embodiments, the order of operations may be rearranged without departing from the spirit of the disclosed subject matter.

Techniques consistent with the disclosure provide, among other features, systems and methods for management of inventory items within a storage facility. While various exemplary embodiments of the disclosed systems and methods have been described above, it should be understood that they have been presented for purposes of example only, and not limitations. It is not exhaustive and does not limit the disclosure to the precise form disclosed. Modifications and variations are possible in light of the above teachings or may be acquired from practicing of the disclosure, without departing from the breadth or scope.

While various embodiments of the disclosure have been illustrated and described, it will be clear that the disclosure is not limited to these embodiments only. Numerous modifications, changes, variations, substitutions, and equivalents will be apparent to those skilled in the art, without departing from the spirit and scope of the disclosure, as described in the claims.

The invention claimed is:

1. A system in a storage facility, the system comprising:

a first static storage system that is affixed to ground and comprises a plurality of shelves, wherein the plurality of shelves may be arranged at different heights from the ground, wherein the plurality of shelves stores a first set of totes;

a first dynamic storage system that is transportable and placed beneath a first shelf that is lowermost amongst the plurality of shelves;

a first robotic apparatus that is configured to transport the first set of totes from the first static storage system to an order fulfilment and replenishment location in the storage facility;

a second robotic apparatus that is configured to transport the first dynamic storage system from beneath the first shelf to the order fulfilment and replenishment location;

a control server configured to:

map a first inventory item to one of the first static storage system and the first dynamic storage system for storage based on:

(i) a first transportation time of the first robotic apparatus to transport a tote of the first set of totes between the first static storage system and the order fulfilment and replenishment location, (ii) a second transportation time of the second robotic apparatus to transport the first dynamic storage system to the order fulfilment and replenishment location, and (iii) a set of attributes of the inventory item that includes at least a consumption rate of the inventory item, and control one of (i) the first robotic apparatus to enable storage of the first inventory item in one of the first set of totes based on the mapping of the first inventory item to the first static storage system or (ii) the second robotic apparatus to enable storage of the first inventory item in the first dynamic storage system based on the mapping of the first inventory item to the first dynamic storage system, wherein when the first inventory item is stored in the first static storage system, the control server changes the mapping of the first inventory item from the first static storage system to the first dynamic storage system based on a consumption rate of the first inventory item exceeding a threshold consumption rate, when the first inventory item is stored in the first dynamic storage system, the control server changes the mapping of the first inventory item from the first dynamic storage system to the first static storage system based on a consumption rate of the first inventory item falling below a threshold consumption rate, when the first inventory item is mapped to a different storage system, the control server sends instructions to a robotic apparatus to retrieve the first inventory item and start a process to transport the first inventory item to the different storage system, and wherein when the control server changes the mapping of the first inventory item between the first static storage system and the first dynamic storage system, the control server controls one of the first robotic apparatus or the second robotic apparatus to change the storage of the first inventory item based on the changed mapping of the first inventory item.

2. The system of claim 1, wherein in performing the mapping, the control server further bases the mapping on a size of the first inventory item, a weight of the first inventory item, a shape of the first inventory item, a number of units of the first inventory item, and a compatibility of the first inventory item with one or more inventory items previously stored in the first static storage system and the first dynamic storage system.

3. The system of claim 1, wherein the control server is further configured to control a movement of the first robotic apparatus and the second robotic apparatus to transport the first set of totes and the first dynamic storage system to the order fulfilment and replenishment location, respectively.

4. The system of claim 1, wherein the control server is further configured to change the mapping of the first inventory item based on a predetermined change in any attribute of the set of attributes of the first inventory item.

5. The system of claim 1, further comprising a second dynamic storage system that is transportable and placed besides the first dynamic storage system, and beneath the first shelf of the first static storage system.

6. The system of claim 1, wherein a space between two shelves of the plurality of shelves is adjustable based on a size and one or more dimensions of the first set of totes.

7. The system of claim 1, wherein the first set of totes comprises a first tote and a second tote such that the second tote is placed besides the first tote on a same shelf of the plurality of shelves, wherein the first tote is configured to store an inventory item of a first type, and the second tote is configured to store an inventory item of a second type.

8. The system of claim 1, wherein the first static storage system has an N-deep storage capability such that a first tote of the set of totes is placed behind a second tote of the set of totes on a same shelf of the plurality of shelves.

9. The system of claim 1, wherein the first static storage system has an N-deep storage capability and the set of totes comprises a first tote and a second tote placed behind the first tote on the same shelf of the plurality of shelves such that the first tote stores a second inventory item and the second tote stores a third inventory item, and wherein, for inventory items that remain mapped to the first static storage system, the control server is further configured to instruct the first robotic apparatus to change a placement order of the first tote and the second tote such that the second tote is placed in front of the first tote on a same shelf based on a consumption rate of the third inventory item exceeding a consumption rate of the second inventory item.

10. The system of claim 1, wherein the order fulfilment and replenishment location in the storage facility includes a working apparatus to process the inventory brought by the totes retrieved from the first static storage system or the first dynamic storage system.

11. The system of claim 1, wherein when the control server changes the mapping of the first inventory item from the first static storage system to the first dynamic storage system, the control server controls one of the first robotic apparatus or the second robotic apparatus to move a tote of the first inventory item to the order fulfilment and replenishment location where the first inventory item is moved to a tote of the first dynamic storage system that is waiting at the order fulfilment and replenishment location.

12. The system of claim 1, wherein the control server is further configured to determine an optimal path for the first robotic apparatus and the second robotic apparatus to traverse the storage facility to transport the first set of totes and the first dynamic storage system to the order fulfilment and replenishment location, respectively based on real-time path availability information of various paths in the storage facility.

13. A method, implemented by a system in a storage facility, the system including a first static storage system that is affixed to ground and comprises a plurality of shelves, wherein the plurality of shelves may be arranged at different heights from the ground, wherein the plurality of shelves stores a first set of totes; a first dynamic storage system that is transportable and placed beneath a first shelf that is lowermost amongst the plurality of shelves; a first robotic apparatus that is configured to transport the first set of totes from the first static storage system to an order fulfilment and replenishment location in the storage facility; a second robotic apparatus that is configured to transport the first dynamic storage system from beneath the first shelf to the order fulfilment and replenishment location, the method comprising:

performing, by a control server, mapping a first inventory item to one of the first static storage system and the first dynamic storage system for storage based on:

(i) a first transportation time of the first robotic apparatus to transport a tote of the first set of totes between the first static storage system and the order fulfilment and replenishment location, (ii) a second transportation time of the second robotic apparatus to transport the first dynamic storage system to the order fulfilment and replenishment location, and (iii) a set of attributes of the inventory item that includes at least a consumption rate of the inventory item, and controlling one of (i) the first robotic apparatus to enable storage of the first inventory item in one of the first set of totes based on the mapping of the first inventory item to the first static storage system or (ii) the second robotic apparatus to enable storage of the first inventory item in the first dynamic storage system based on the mapping of the first inventory item to the first dynamic storage system, wherein when the first inventory item is stored in the first static storage system, the control server changes the mapping of the first inventory item from the first static storage system to the first dynamic storage system based on a consumption rate of the first inventory item exceeding a threshold consumption rate, when the first inventory item is stored in the first dynamic storage system, the control server changes the mapping of the first inventory item from the first dynamic storage system to the first static storage system based on a consumption rate of the first inventory item falling below a threshold consumption rate, when the first inventory item is mapped to a different storage system, the control server sends instructions to a robotic apparatus to retrieve the first inventory item and start a process to transport the first inventory item to the different storage system, and wherein when the control server changes the mapping of the first inventory item between the first static storage system and the first dynamic storage system, the control server controls one of the first robotic apparatus or the second robotic apparatus to change the storage of the first inventory item based on the changed mapping of the first inventory item.

* * * * *